(12) United States Patent
Endo et al.

(10) Patent No.: US 7,018,315 B2
(45) Date of Patent: Mar. 28, 2006

(54) HYDRAULIC CONTROL APPARATUS FOR VEHICLE AND METHOD THEREOF

(75) Inventors: Hiroatsu Endo, Nagoya (JP); Shinichi Kojima, Susono (JP); Tatsuya Ozeki, Nissin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/653,212

(22) Filed: Sep. 3, 2003

(65) Prior Publication Data
US 2004/0063539 A1  Apr. 1, 2004

(30) Foreign Application Priority Data
Sep. 10, 2002  (JP) .............. 2002-263894

(51) Int. Cl.
*F16H 47/00*  (2006.01)

(52) U.S. Cl. ............. 475/88; 475/90; 475/120

(58) Field of Classification Search .......... 475/84, 475/88, 89, 90, 118, 120, 123
See application file for complete search history.

(56) References Cited

U.S. PATENT DOCUMENTS 5,370,588 A * 12/1994 Sawase et al. ............. 475/84
5,454,762 A * 10/1995 Sawase et al. ............. 475/84
5,827,145 A * 10/1998 Okcuoglu .................. 475/88
6,508,735 B1 * 1/2003 Murakami et al. ......... 475/120

FOREIGN PATENT DOCUMENTS

| JP | 49-45266 |   | 4/1974 |         |
|----|----------|---|--------|---------|
| JP | 56-66543 | * | 6/1981 | 475/123 |
| JP | 57-97942 |   | 6/1982 |         |
| JP | 9-112674 |   | 5/1997 |         |
| JP | 10-89445 |   | 4/1998 |         |
| JP | 11-189073 A |   | 7/1999 |         |
| JP | 2000-18377 A |   | 1/2000 |         |
| JP | 2001-90828 |   | 4/2001 |         |
| JP | 2002-227979 A |   | 8/2002 |         |

* cited by examiner

*Primary Examiner*—Ha Ho
(74) *Attorney, Agent, or Firm*—Kenyon & Kenyon LLP

(57) ABSTRACT

A hydraulic control apparatus for a vehicle including an electric oil pump, a pump control portion which controls the electric oil pump, a hydraulic circuit portion which supplies a hydraulic pressure from the electric oil pump to an actuator of a transaxle of the vehicle, a hydraulic circuit control portion which outputs a control signal to the hydraulic circuit portion, and an oil pump rotation control portion which is provided in the pump control portion and which controls a rotational state of the electric oil pump according to a change in a control status of the hydraulic circuit control portion.

16 Claims, 17 Drawing Sheets

FIG. 5

| POSITION | MODE | ENGAGEMENT ELEMENT | C1 | C2 | B1 |
|---|---|---|---|---|---|
| B,D | ETC MODE | | × | ○ | × |
| | DIRECT CONNECTION MODE | | ○ | ○ | × |
| | MOTOR RUNNING MODE (FORWARD) | | ○ | × | × |
| N,P | NEUTRAL | | × | × | × |
| | CHARGE/ENGINE START MODE | | × | × | ○ |
| R | MOTOR RUNNING MODE (REVERSE) | | ○ | × | × |
| | FRICTION RUNNING MODE | | ○ | × | △ |

HYDRAULIC CONTROL APPARATUS FOR VEHICLE AND METHOD THEREOF

INCORPORATION BY REFERENCE

The disclosure of Japanese Patent Application No. 2002-263894 filed on Sep. 10, 2002 including the specification, drawings and abstract is incorporated herein by reference in its entirety.

BACKGROUND OF THE INVENTION

1. Field of the Invention

The invention relates to a hydraulic control apparatus for a vehicle and method thereof. More particularly, the invention relates to a hydraulic control apparatus including control means for controlling a rotational speed of an electric oil pump motor.

2. Description of the Related Art

A conventional hydraulic control apparatus for a vehicle includes an oil pump, and is configured to supply a hydraulic pressure generated by the oil pump to actuators of an automatic transmission and the like so as to drive the actuators, and to supply pressure oil to various portions of the vehicle so as to lubricate the portions.

Previously, an oil pump was configured so as to be directly connected to an input shaft extending from an engine to a transmission. In this configuration, an oil pump having a large discharge capacity was employed such that a required amount of oil for shift control can be obtained even a rotational speed of the input shaft was low. However, when the rotational speed of the input shaft increased, an excessive amount of oil was generated, which resulted in unnecessary consumption of a driving force generated by the pump.

Accordingly, there exists a conventional hydraulic control apparatus in which an oil pump is driven by an electric motor, and a rotational speed of the oil pump motor is controlled such that a required hydraulic pressure and a required flow volume of pressure oil can be obtained.

For example, a rotation control apparatus of an oil pump disclosed in Japanese Patent Laid-Open Publication No. 2000-18377 performs control for decreasing a rotational speed of the pump to a rotational speed corresponding to a minimum line pressure or less. This control is performed so as to prevent excessive consumption of energy, and noise caused by driving the pump, based on the fact that a required line pressure is lower than the minimum line pressure when next shifting is not performed immediately, for example, when a vehicle is stopped due to application of a barking force.

As another conventional hydraulic control apparatus, there exists a fluid pressure control apparatus for a hybrid vehicle including a belt type continuously variable automatic transmission, which is disclosed in Japanese Patent Laid-Open Publication No. 11-189073. The conventional apparatus includes an electric oil pump such that pressure oil can be supplied to the automatic transmission even when an engine is stopped. During steady running of the vehicle, the apparatus drives the electric motor of the oil pump at low speed such that the minimum amount of pressure oil for maintaining the present gear ratio can be obtained. During shifting of the automatic transmission, the apparatus performs control for driving the electric motor at high speed.

In the conventional hydraulic control apparatus, when an operation state of the vehicle (hereinafter, referred to as a "vehicle operation state") is changed to a high load state, a rotational speed of the electric oil pump is returned from a low rotational speed state to a high rotational speed state in which a required line pressure can be generated, such that a required hydraulic pressure and a required amount of oil for shifting of the automatic transmission and engagement of a clutch mechanism are obtained. However, in a control state in which a vehicle speed and an engine speed are detected and the rotational speed of the electric oil pump is increased such that the required hydraulic pressure is generated, a problem may occur that the rotational speed of the electric pump is excessively low, which causes a temporary insufficiency of a hydraulic pressure in an early stage of a change in the vehicle operation state. For example, when actuators of the automatic transmission and the clutch mechanism are attempted to be driven before a rotational speed of an engine shaft is increased, the rotational speed of the oil pump is too low to increase the hydraulic pressure, and driving of the actuator is delayed. Accordingly, problems may occur, for example, shifting cannot be performed smoothly, and a belt slips in the case of the belt type continuously variable transmission.

In a hybrid vehicle in which two drive sources, that are an engine and a motor generator, are arranged, even when regenerative braking is being performed or power generation is being performed during running, a rotational speed of the oil pump motor needs to be increased from a low rotational speed region to a high rotational speed region such that an engagement state of a clutch of a power switching mechanism is changed, an appropriate gear ratio is obtained or a belt holding force of the CVT is increased. However, in the conventional hydraulic control apparatus, hydraulic control based on such a change in the operation state of the hybrid vehicle is not performed.

Also, in the conventional hydraulic control apparatus, a return speed is not adjusted at which the rotation of the oil pump is returned from the low rotational speed region to the high rotational speed region. Accordingly, a problem may occur that the rotational speed of the oil pump is further insufficient particularly in the early stage of the change in the operation state.

SUMMARY OF THE INVENTION

In the light of the above-mentioned circumstances, it is an object of the invention to provided a hydraulic control apparatus for a vehicle which can return a rotational speed of an electric oil pump motor, which is in a low rotational speed state, to a required high rotational speed region promptly without delay when an operating load of a vehicle is being changed.

It is another object of the invention to provide a hydraulic control apparatus for a vehicle which can return a rotational speed of an electric oil pump motor to a required high rotational speed region promptly without delay, and which can be sufficiently applied to hydraulic control specific to the above-mentioned hybrid vehicle.

In order to achieve the above-mentioned objects, a hydraulic control apparatus for a vehicle according to an aspect of the invention includes an electric oil pump, a pump control portion which controls the electric oil pump, a hydraulic circuit portion which supplies a hydraulic pressure from the electric oil pump to an actuator of a transaxle of the vehicle, a hydraulic circuit control portion which outputs a control signal to the hydraulic circuit portion, and an oil pump rotation control portion which is provided in the pump control portion and which controls a rotational state of the electric oil pump based on a change in a control status of the hydraulic circuit control portion.

The hydraulic control apparatus for a vehicle further includes a vehicle operation state determining portion, and a hydraulic pressure determining portion which determines, based on a determination result, whether a hydraulic pressure of the hydraulic system of the vehicle needs to be in a low hydraulic pressure region or in a high hydraulic pressure region. The hydraulic circuit control portion is configured to compute the control signal based on a result of the vehicle operation state determination. The oil pump rotation control portion is configured to control a rotational speed of the oil pump motor based on a result of the hydraulic pressure determination.

The change in the control status signifies a change in a control level and a control content in the hydraulic circuit control portion due to a change in an operation condition when it is determined that the operation condition required for the actuator is changed. More particularly, the change signifies a case where a control signal for increasing a hydraulic pressure to the hydraulic circuit, a case where a control flag is set for controlling the hydraulic circuit, and the like.

According to the invention, a control state required for the actuator is determined by detecting a change in the control status of the hydraulic circuit control portion, that is, a change in an operation condition for the actuator, and a rotational state of the electric oil pump is controlled based on a load change command for the actuator, which is obtained based on the determination result. Accordingly, when a hydraulic pressure is required for driving the actuator, the rotational speed of the oil pump can be increased in advance. As a result, pressure oil can be supplied to the actuator without delay in an entire process in which the operation state of the vehicle changes.

Further, a hydraulic control apparatus for a vehicle according to another aspect of the invention includes an electric oil pump; an electric oil pump control portion; a hydraulic circuit portion which supplies a hydraulic pressure from the electric oil pump to an actuator of a transaxle of the vehicle; a hydraulic circuit control portion which outputs a control signal to the hydraulic circuit portion; a vehicle operation state determining portion; a hydraulic pressure determining portion which determines based on a determination result whether a hydraulic pressure of the hydraulic system of the vehicle needs to be in a low hydraulic pressure region or in a high hydraulic pressure region, an oil pump rotation control portion which controls a rotational speed of the electric oil pump based on a result of the hydraulic pressure determination, and a rotation return portion which sets a rotational speed of the electric oil pump to be in a low rotational speed region when it is determined as a result of the hydraulic pressure determination that the hydraulic pressure of the hydraulic system needs to be in the low hydraulic pressure region, and sets a rotational speed of the electric oil pump to be in a high rotational speed region when it is determined as a result of the hydraulic pressure determination that the hydraulic pressure of the hydraulic system needs to be in the high hydraulic pressure region, and which returns the rotation of the electric oil pump from the low rotational speed region to the high rotational speed region. The rotation return portion sets a rate of change of the rotational speed of the electric oil pump when the rotational speed of the electric oil pump returns from the low rotational speed region to the high rotational speed region to be larger than a rate of change of the rotational speed of the electric oil pump when the rotational speed fluctuates in the high rotational speed region. Namely, the rotation return portion sets a return inclination of the rotational speed of the oil pump from the low rotational speed region to the high rotational speed region to be larger than a fluctuation inclination (rate of change) of the rotational speed of the oil pump.

According to the invention, since a rotational speed of an electric oil pump motor can return from a low rotational speed region to a high rotational speed region promptly, even in an early stage of a change in an operation state of a vehicle, the rotational speed of the oil pump is not insufficient, and a required hydraulic pressure can be generated.

BRIEF DESCRIPTION OF THE DRAWINGS

FIG. 5 is a table showing relationships between operation states of clutches and a brake of the transaxle, and running modes;

DETAILED DESCRIPTION OF THE PREFERRED EMBODIMENTS

Figure 1:
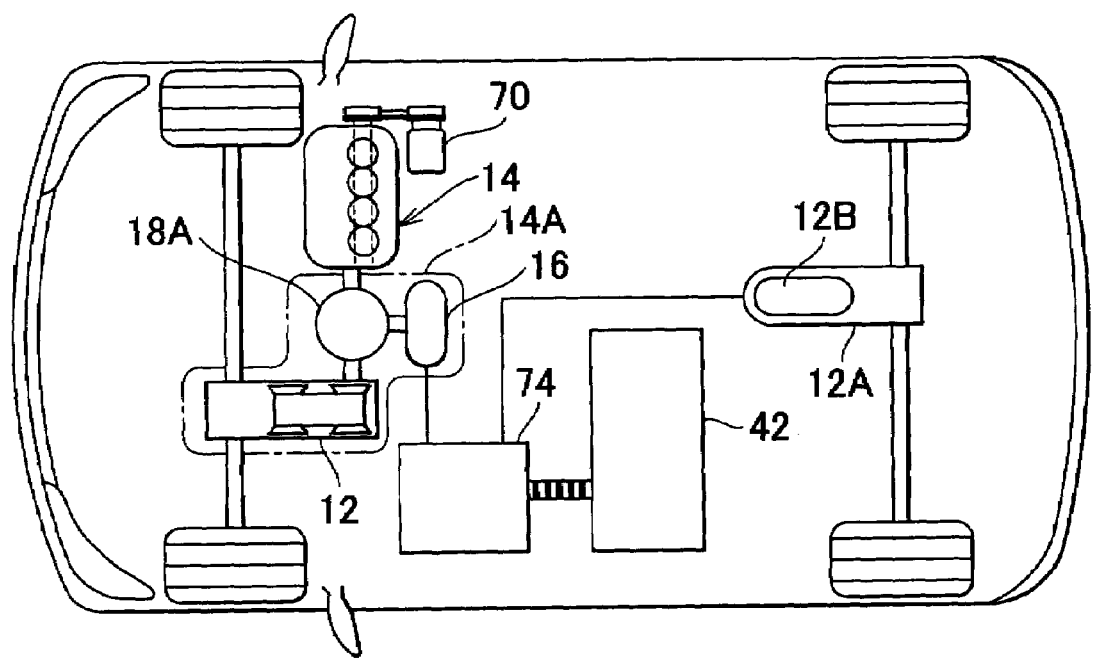
FIG. 1 is a view schematically showing an example of a hybrid vehicle including a hydraulic control apparatus for a vehicle according to the invention.

Hereafter, a preferred embodiment according to the invention will be described with reference to accompanying drawings. FIG. 1 is a view schematically showing an example of a hybrid vehicle including a hydraulic control apparatus for a vehicle according to the invention. A reference numeral 14 denotes an engine as an internal combustion engine, and a reference numeral 14A denotes a front transaxle. The front transaxle includes a motor generator 16 which functions as an electric motor or a power generator, a power switching mechanism 18A provided with a gear train, and a belt type continuously variable transmission (CTV) 12.

A reference numeral 12A denotes a rear transaxle including a motor generator 12B. A reference numeral 74 denotes an inverter with a converter, which controls a direct current from a battery and an alternate current from the motor generator. The power switching mechanism 14A is configured to transmit power from the engine, power from the motor generator, or both of them to the CVT. A reference numeral 42 denotes the battery, and a reference numeral 70 denotes a starter.

Figure 2:
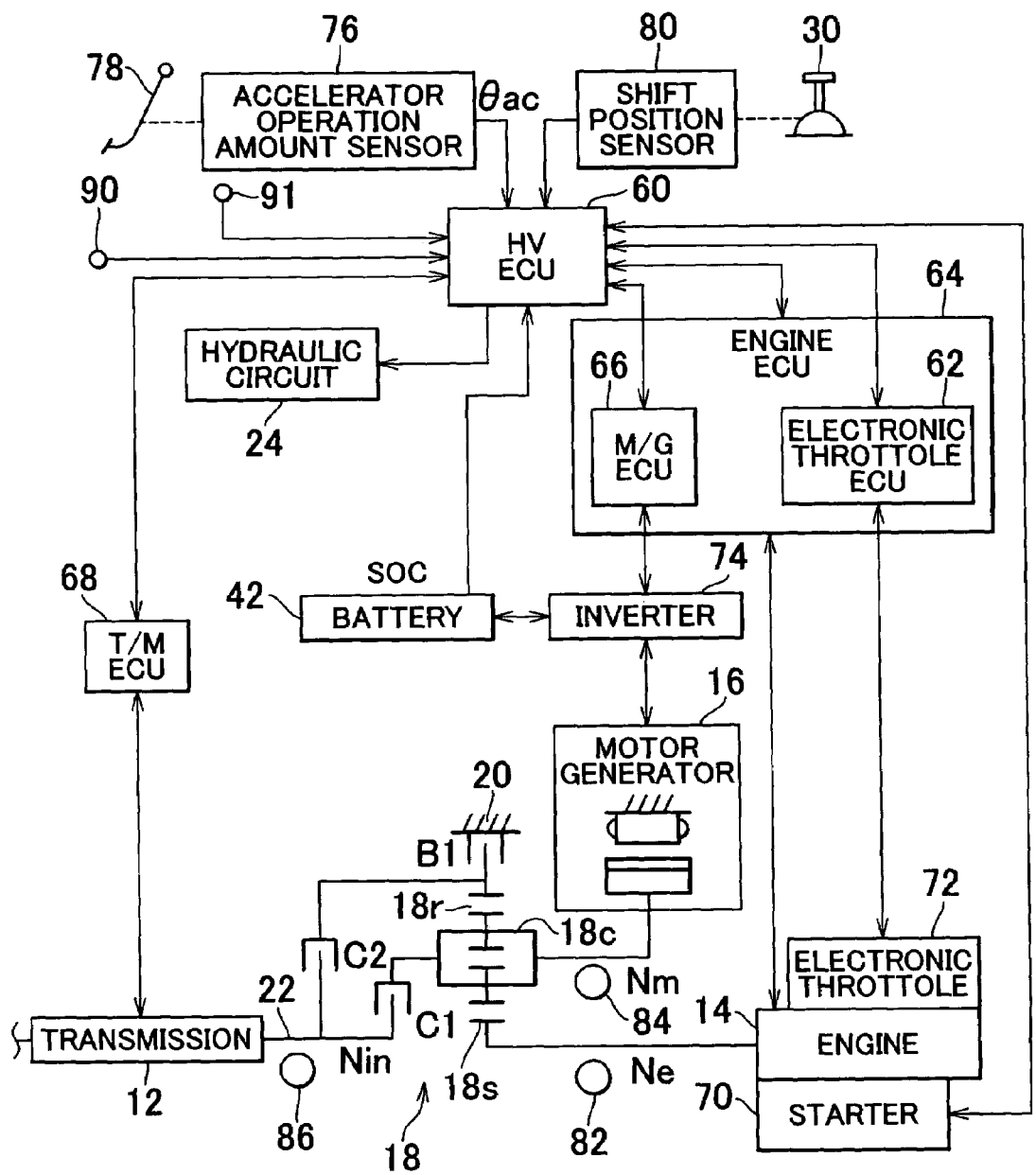
FIG. 2 is a block diagram showing an entire configuration of a control system of the hybrid vehicle.

FIG. 2 shows an entire configuration of a control system of the hybrid vehicle. A power switching mechanism 18A includes a planetary gear device 18 of a double pinion type. A sun gear 18s of the planetary gear device 18 is connected to the engine 14. A carrier 18c is connected to the motor generator 16. A ring gear 18r is connected to a case 20 via a first brake B1. The carrier 18c is connected to an input shaft 22 of the CVT 12 via a first clutch C1. The ring gear 18r is connected to the input shaft 22 via a second clutch C2.

The clutches C1, C2 and the first brake B1 are hydraulic friction engagement devices of mutliplate wet type, which are frictionally engaged by actuators that are driven using pressure oil, and are frictionally engaged using operating pressure oil supplied from a hydraulic circuit 24.

Figure 3:
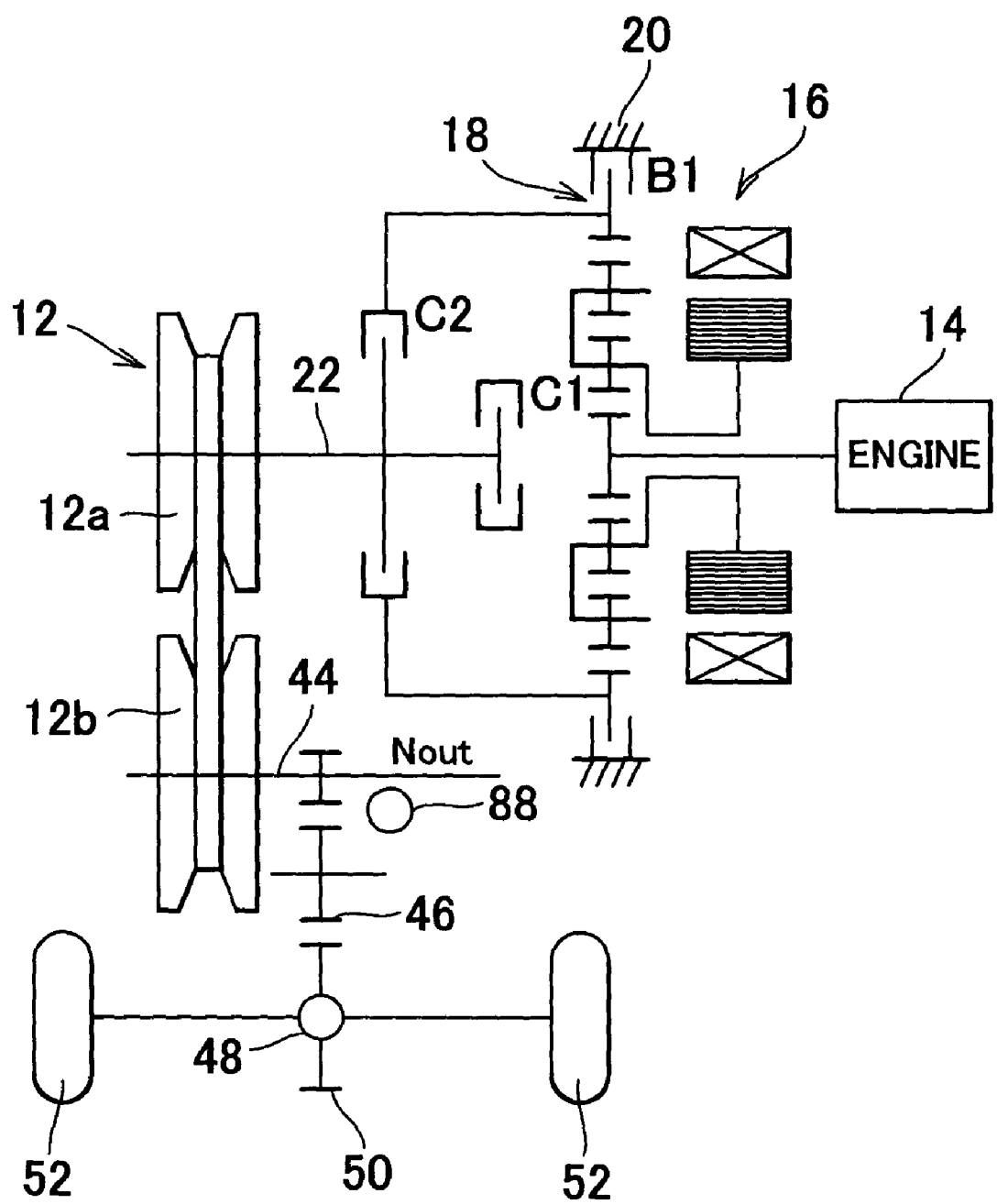
FIG. 3 is a block diagram showing a configuration of a transaxle in FIG. 1.

FIG. 3 shows a configuration of the front transaxle 14A in FIG. 1. In this configuration, power is transmitted from an output shaft 44 of the belt type continuously variable transmission (CVT) 12 via a counter gear 46 to a ring gear 50 of a differential gear 48, and is distributed to front wheels 52 by the differential gear 48.

The CVT 12 includes a pair of variable pulleys 12a, 12b. Each of the pulleys is provided with a pair of circular tapered pulley halves, one of which is fixed and the other of which is movable (hereinafter, referred to as a "fixed pulley half" and a "movable pulley half"). The movable pulley half is moved with respect to the fixed pulley half such that a width of a V-groove between the pulley halves is changed. Thus, a winding radius of a variable belt which is provided on the groove can be changed as necessary.

A gear ratio ? (=input shaft rotational speed Nin/output shaft rotational speed Nout) continuously changes as the width of the V-groove is changed by the hydraulic actuator of the primary pulley 12a. A belt holding force (i.e., tension) is adjusted by the hydraulic actuator of the secondary pulley 12b.

Figure 4:
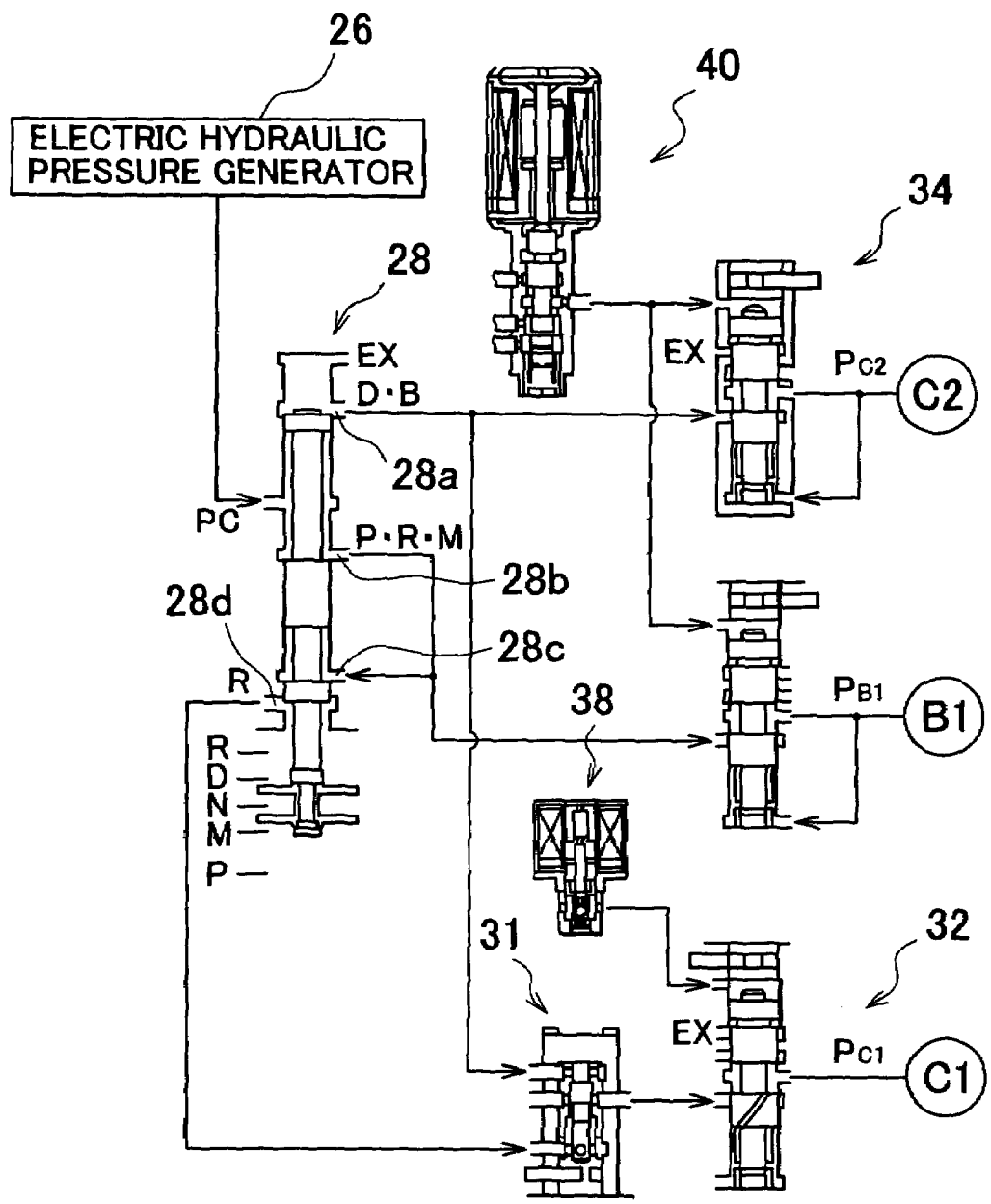
FIG. 4 is a diagram showing a main portion of a hydraulic circuit for a power switching mechanism.

FIG. 4 is a diagram showing a main portion of the hydraulic circuit 24 for the power switching mechanism 18 that is provided with the gear train. An initial hydraulic pressure PC generated by an electric hydraulic pressure generator (an electric oil pump) 26 including an electric pump is supplied to the clutches C1, C2 and the brake B1 via a manual valve 28 according to a shift position of a shift lever 30 shown in FIG. 1.

The shift lever 30 is configured so as to be in one of the five shift positions "B", "D", "N", "R", and "P" according to the vehicle operation state. The position "B" is a shift position in which a relatively large engine braking force can be generated when the vehicle is running forward. The position "D" is a shift position for forward running. In these shift positions, the initial hydraulic pressure PC can be supplied from an output port 28a of the valve 28 to the clutch C1 and the clutch C2. In the case where one of these shift positions is selected, when a brake pedal is depressed, a regenerative braking is performed. The initial hydraulic pressure PC is supplied to the first clutch C1 via a shuttle valve 31.

The position "N" is a shift position for interrupting power from the power source. The position "R" is a shift position for backing up the vehicle. The position "P" is a shift position for interrupting power from the power source and for mechanically locking rotation of a driving wheel. In these shift positions, the initial hydraulic pressure PC is supplied from an output port 28b to the first brake B1.

The initial hydraulic pressure PC output from the output port 28b is input in a return port 28c. In the shift position "R", the initial hydraulic pressure PC output from the return port 28c is supplied via an output port 28d and the shuttle valve 31 to the first clutch C1.

A control valve 32 is provided on the clutch C1, and controls a hydraulic pressure $P_{C1}$ supplied to the clutch C1. A control valve 34 is provided on the clutch C2, and controls a hydraulic pressure $P_{C2}$ supplied to the clutch C2. A control valve 36 is provided on the braked B1, and control a hydraulic pressure $P_{B1}$ supplied to the brake B1. The hydraulic pressure $P_{C1}$ supplied to the clutch C1 is adjusted by a duty solenoid valve 38 for controlling clutch C1 engagement pressure, such that an engagement force of the clutch C1, which transmits rotation of the carrier 18c (FIG. 2) to the CVT side, is controlled. The hydraulic pressures supplied to the clutch C2 and the brake B1 are adjusted by a linear solenoid valve 40. The linear solenoid valve 40 controls engagement of the clutch C2 which transmits the rotation of the ring gear 18r to the CVT side, and engagement of the brake B1 which stops the rotation of the ring gear.

The operation states of the clutches C1, C2 and the brake B1 correspond to the running modes shown in FIG. 5. In the position "B", or the position "D", one of an "ETC mode", a "direct connection mode", and a "motor running mode (forward)" is selected.

In the "ETC mode", when the clutch C2 is engaged and the first brake B1 is released, that is, when the sun gear 18s, the carrier 18c and the ring gear 18r can rotate with respect to each other, both the engine 14 and the motor generator 16 are operated such that torque is applied to the sun gear 18s and the carrier 18c, and the ring gear 18r is rotated. Thus, the vehicle runs forward.

In the "direct connection mode", when each of the clutches C1, C2 is engaged and the first brake B1 is released, the engine 14 is operated. Thus, the vehicle runs forward. In the "direct connection mode", the motor generator 16 can be driven as a power generator depending on an amount of electric power SOC stored in the battery 42 in FIG. 2. In this case, by increasing engine torque, the amount SOC of the stored electric power can be maintained/recovered so as to be within an appropriate range.

In the "motor running mode (forward)", the clutch C1 is engaged, the clutch C2 and the first brake B1 are released, and the motor generator 16 is operated such that the vehicle runs forward. In the "motor running mode (forward)", regenerative control for the motor generator 16 is performed, for example, during deceleration (an accelerator is OFF), such that the battery 42 can be charged according to kinetic energy of the vehicle and the vehicle can generate a braking force.

In the position "N", or the position "P", either one of "neutral" or a "charge/engine start mode" is realized. In "neutral", the clutches C1, C2 and the first brake B1 are all released. In the "charge/engine start mode", the clutches C1, C2 are released and the first brake B1 is engaged. Also, the motor generator 16 is rotationally-driven for power generation by the engine 14 via the planetary gear device 18. Thus, electric energy is generated, and the battery 42 is charged.

In the position "R", either one of a "motor running mode (reverse)" or a "friction running mode" is realized. In the "motor running mode (reverse)", when the clutch C1 is engaged, and the second clutch C2 and the first brake B1 are released, the motor generator 16 is rotationally-driven in a reverse direction such that the carrier 18c and the input shaft 22 are rotated in the reverse direction. Thus, the vehicle backs up.

The "friction running mode" is performed when an assistance request is made during backing up in the "motor running mode (reverse)". In the "friction running mode", when the engine 14 is started such that the sun gear 18s is rotated in a normal direction, and the ring gear 18r is rotated in the normal direction in accordance with the rotation of the sun gear 18s, the first brake B1 is slip-engaged such that the rotation of the ring gear 18r is limited. Thus, the carrier 18c is supplied with a rotational power in the reverse direction so as to assist the reverse running.

The hydraulic circuit 24 includes a circuit for controlling the gear ratio ? of the transmission 12 and the continuously belt holding force, and is supplied with operating oil from a common electric oil pump 26. The operating oil from the hydraulic circuit 24 is stored in an oil pan so as to lubricate the planetary gear device 18 and the differential gear 48, and part of the operating oil is supplied so as to cool the motor generator 16 (FIG. 2).

The control system of the hybrid vehicle shown in FIG. 2 includes a hybrid computer (HVECU) 60. The HVECU 60 includes a CPU, RAM, ROM and the like. Programs for performing various control, which will be described later, are set and stored in the ROM in advance. Programs and data necessary for various control are temporarily stored in the RAM.

The HVECU 60 controls an engine ECU 64, a duty solenoid 38 for the hydraulic circuit 24, the linear solenoid 40, the starter 70 of the engine 14 and the like. The engine ECU 64 controls opening/closing of an electronic throttle valve 72 of the engine 14. The engine ECU 64 controls an engine power using a fuel injection amount of the engine 14, a variable valve timing mechanism, ignition timing and the like.

The engine ECU 64 controls driving torque, regenerative braking torque and the like of the motor generator 16 via the inverter 74. The engine ECU 64 controls the gear ratio ?, the belt holding force and the like of the transmission 12. The starter 70 is connected to a crank shaft of the engine 14 via a power transmission device such as a belt and a chain (refer to FIG. 1).

A signal indicative of an operation amount ?ac of an accelerator pedal 78 is supplied from an accelerator operation amount sensor 76 to the HVECU 60. A shift position instruction signal for the shift lever 30 is supplied from a shift position sensor 80. An engine speed Ne from an engine speed sensor 82 is input in the HVECU 60. Similarly, a motor rotational speed Nm from a motor rotational speed sensor 84, an input shaft rotational speed (a rotational speed of the input shaft 22) Ni from an input shaft rotational speed sensor 86, an output shaft rotational speed (a rotational speed of the output shaft 44) Nout from an output shaft rotational speed sensor 88 (refer to FIG. 3), a temperature $TH_{CVT}$ of operating oil in the hydraulic circuit 24 from a CVT oil temperature sensor 90, a temperature $TH_w$ of coolant for the engine 14 from a coolant temperature sensor 91 are input in the HVECU 60.

An oil temperature is detected by the CVT oil temperature sensor 90, and a vehicle speed V is detected based on the output shaft rotational speed Nout. In addition, various signals indicative of the vehicle operation state such as an amount of electric power (remaining amount) stored in the battery 42 are supplied to HVECU 60. The accelerator operation amount ?ac corresponds to the output amount requested by a driver.

Figure 6:
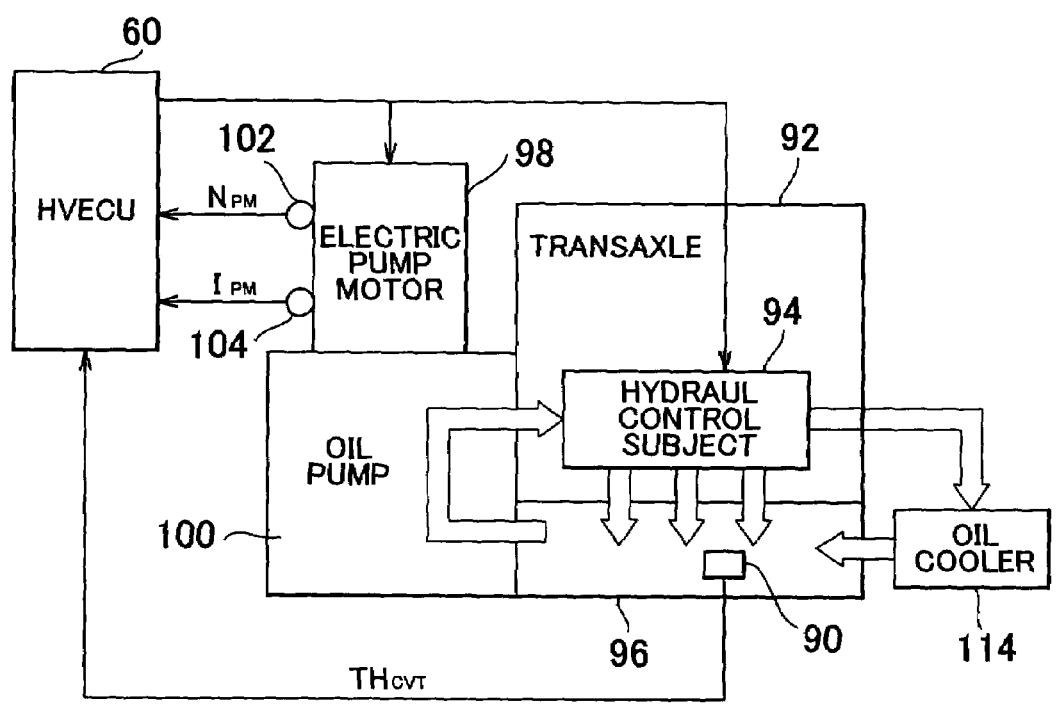
FIG. 6 is a functional block diagram explaining a schematic configuration of a hydraulic control system.

FIG. 6 is a functional block diagram explaining a schematic configuration of the hydraulic control system. A transaxle 92 includes the transmission 12, the planetary gear device 18, and the differential gear 48. A hydraulic control subject 94 corresponds to a hydraulic actuator (a hydraulic cylinder) for shifting of the CVT 12, a hydraulic cylinder for holding the belt, the actuators of the first brake B1, the clutches C1, C2 and the like of the planetary gear device 18, or an electromagnetic switch valve and an electromagnetic hydraulic control valve controlled by the HVECU 60, such as a duty solenoid 38, and a linear solenoid 40.

The operating oil in an oil pan 96 is pumped up by an electric oil pump 100, and is supplied to the hydraulic control subject mechanism 94 such that the hydraulic actuator is driven and the clutch mechanism and the pulleys of the CVT are operated. The extra hydraulic pressure is used for lubricating various portions in the transaxle 92, and/or is supplied to an oil cooler 114 such that the oil temperature $TH_{CVT}$ is adjusted.

Figure 7:
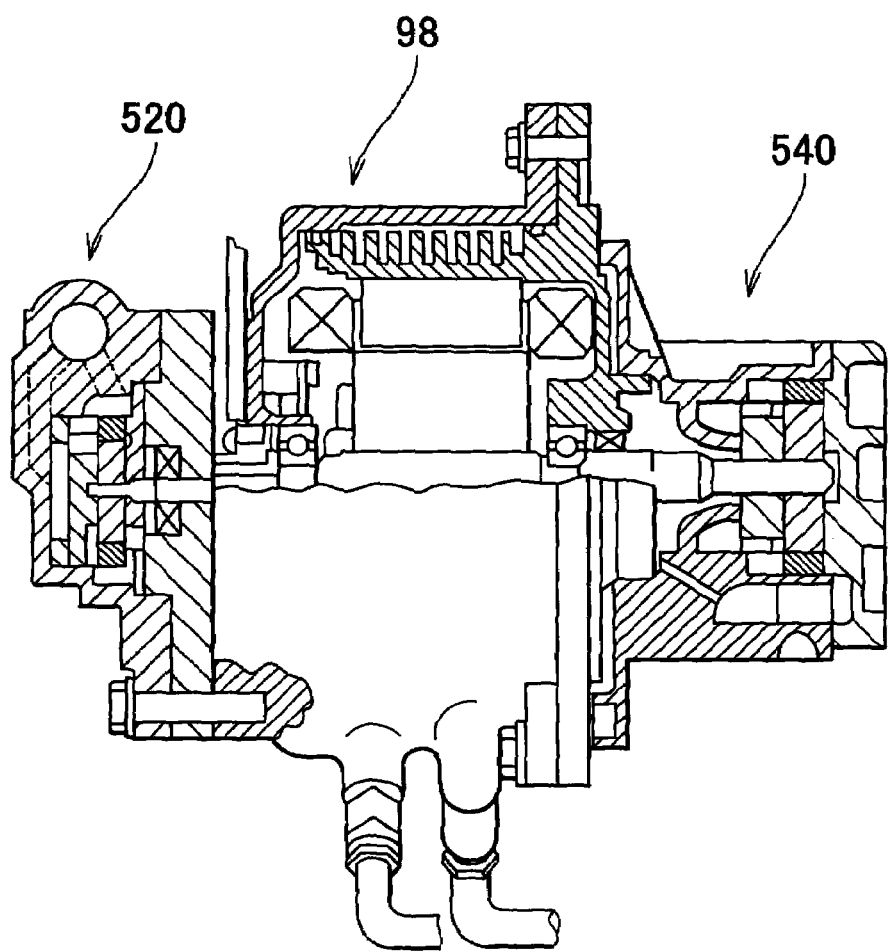
FIG. 7 is a view schematically showing an entire configuration of an electric hydraulic pump.

The oil pump 100 is a rotating pump such as a gear pump, and is rotationally-driven by a dedicated electric motor 98. FIG. 7 shows an electric hydraulic pump which is formed by integrally arranging the electric motor 98, a first hydraulic pump 520, and a second hydraulic pump 540. The first hydraulic pump 520 is for power steering, and the second hydraulic pump is for shifting of the CVT and the clutch for switching the running mode.

In FIG. 6, the electric hydraulic pressure generator 26 is provided with the oil pump 100 and the electric motor 98. The electric motor 98 is controlled by the HVECU 60 via the inverter 74. A signal indicative of a motor rotational speed $N_{PM}$ from a resolver (a rotational speed sensor) 102, and a signal indicative of a driving current $I_{PM}$ corresponding to motor torque from an ammeter 104 are supplied to the HVECU 60. The motor rotational speed $N_{PM}$ corresponds to the pump rotational speed (the discharge amount from the oil pump 100), and the driving current $I_{PM}$ corresponding to the motor torque corresponds to the driving force and the hydraulic pressure of the oil pump 100.

Figure 8:
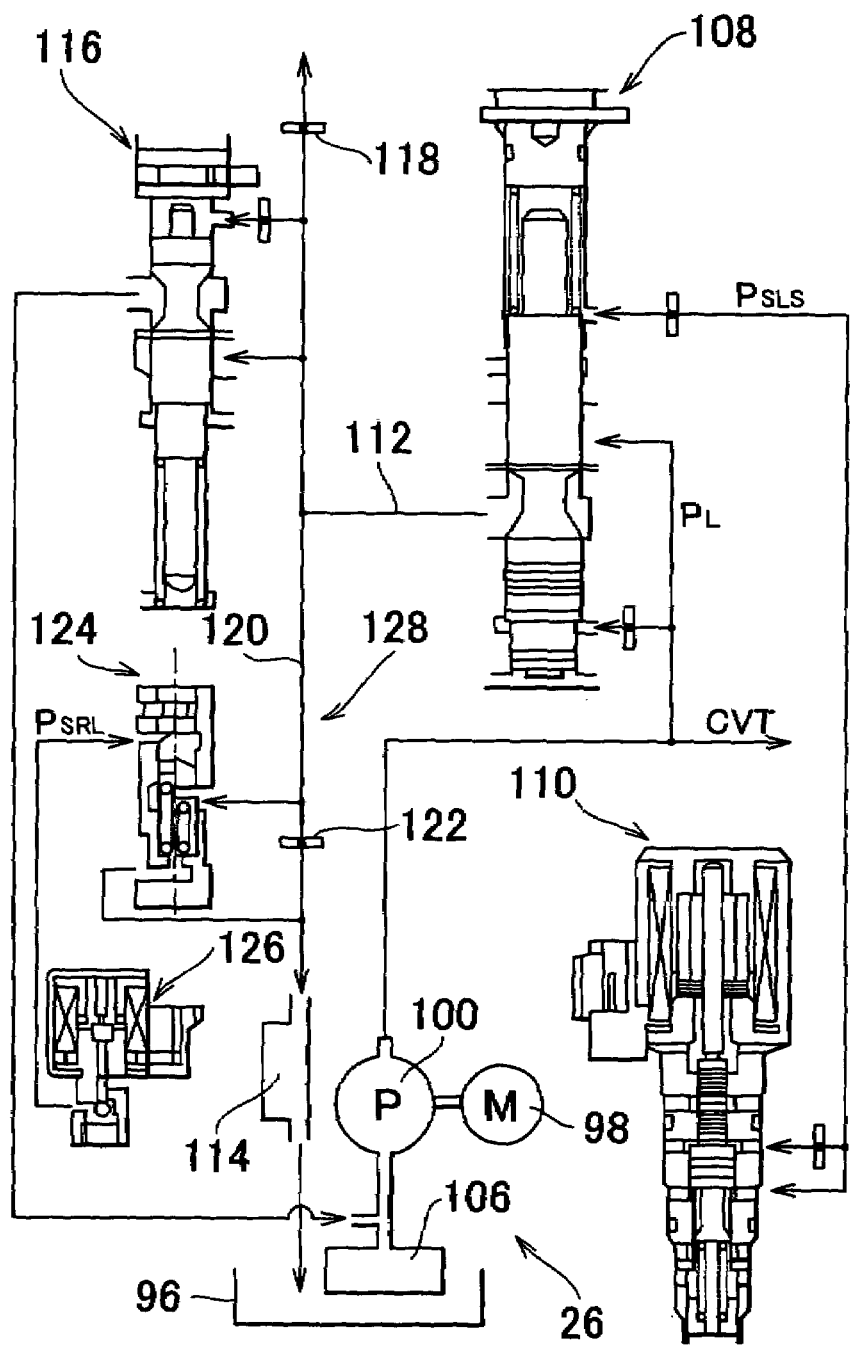
FIG. 8 is a diagram showing a hydraulic circuit in which a line hydraulic pressure is generated.

FIG. 8 is a diagram showing a portion of the hydraulic circuit 24. In this portion, a line hydraulic pressure $P_L$, based on which the initial hydraulic pressure PC is obtained, is generated. The operating oil which is pumped up by the oil pimp 100 through a strainer 106 is adjusted by a primary regulator valve 108 which functions as a pressure control valve, so as to have the predetermined line pressure $P_L$.

A signal pressure $P_{SLS}$ of a linear solenoid valve 110 which is controlled by the HVECU 60 is supplied to the primary regulator valve 108. The line hydraulic pressure $P_L$ is controlled according to the signal pressure $P_{SLS}$, and the extra operating oil reflows to an oil passage 112.

The line hydraulic pressure $P_L$ is used as the base of the initial hydraulic pressure PC. In addition, the line pressure $P_L$ is used for shift control of the transmission 12, and control of the belt holding force. Accordingly, the line pressure $P_L$ is adjusted so as to be the required hydraulic pressure $P_L$ which is obtained using, for example, the accelerator operation amount ?ac, that is, the transmission torque of the power switching mechanism 18, as parameters.

The operating oil in the oil passage 112 is supplied from an orifice 118 to various lubrication portions of the hydraulic circuit 24, and part of the operating oil is supplied from a coolant supply oil passage 120 to the oil cooler 114 so as to be cooled. The operating oil is adjusted by a regulating valve 116 so as to have a predetermined hydraulic pressure such that an appropriate amount of operating oil is supplied to the lubrication portions and the oil cooler 114.

The oil cooler 114 is a water-cooled heat exchanger. During operation of the engine 14, the coolant temperature $TH_w$ is approximately 80° C. to 100° C. Accordingly, the temperature of the operating oil can be increased or decreased using the coolant.

In the coolant supply oil passage 120, a fixed orifice 122 having a fixed cross sectional area, and a cooler control valve 124 are provided in parallel. The opening/closing of the cooler control valve 124 is controlled according to a signal pressure $P_{SRL}$ supplied from an electromagnetic valve 126.

Figure 9:
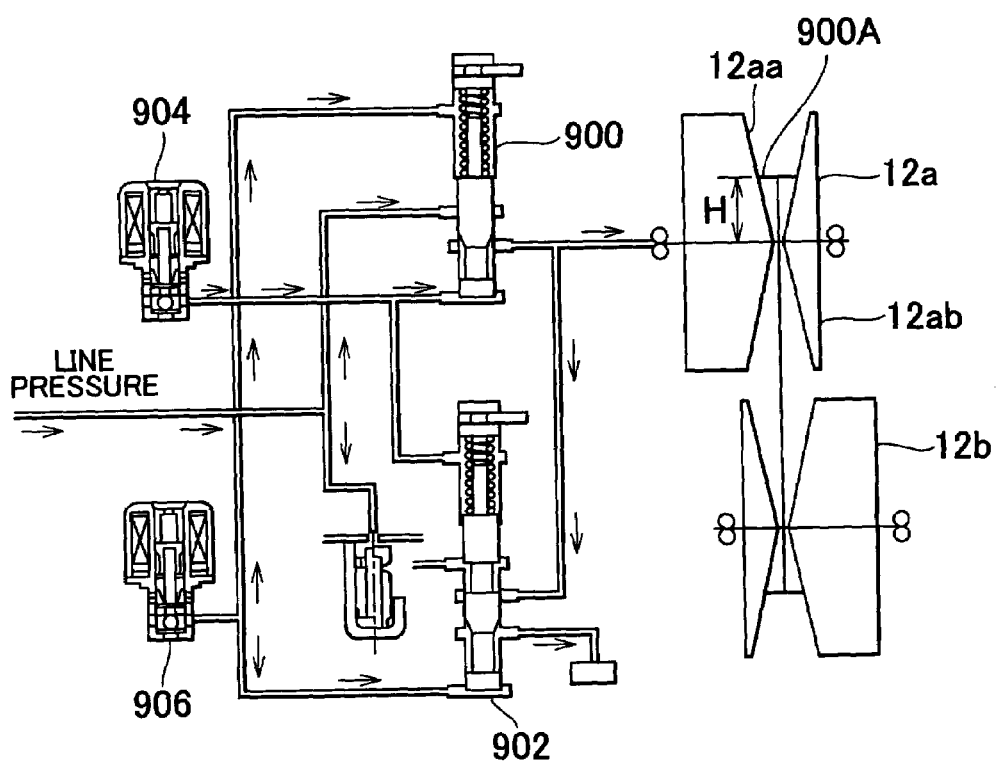
FIG. 9 shows a hydraulic circuit of a hydraulic actuator for a primary pulley for shifting of a CVT.

FIG. 9 shows a hydraulic circuit of the hydraulic actuator of the primary pulley 12a for shifting of the CVT 12. The hydraulic circuit supplies a line pressure to a movable pulley half 12aa of the primary pulley 12a. The width of the groove between the movable pulley half 12aa and the fixed pulley half 12ab is adjusted, and an effective radius of the primary pulley is determined. The winding radius of the belt of the primary pulley is determined according to the effective radius, and shifting is performed at a predetermined gear ratio.

A control valve 900 for acceleration control and a control valve 902 for deceleration control are connected to the hydraulic chamber of the movable pulley half 12aa, and the hydraulic pressure supplied to the hydraulic chamber of the movable pulley half 12aa is adjusted. The hydraulic pressure for acceleration control is adjusted by a duty solenoid 904, and the hydraulic pressure for deceleration control is adjusted by a duty solenoid 906. The duty solenoid 904 controls the amount of oil supplied to the primary pulley due to the line pressure, according to a wheel speed and an accelerator opening so as to control the acceleration speed. The duty solenoid 906 controls the amount of oil flowing out of the primary pulley due to the line pressure, according to the wheel speed and the accelerator opening so as to control the deceleration speed.

In FIG. 9, a reference character "H" denotes a distance (i.e., belt winding radius) between a continuous belt 900A and a central axis of the pulley 12a. When the gear ratio is high, that is, when the distance between the two pulley halves 12aa, 12ab is large and the effective radius is small, the winding radius is small. When the gear ratio is small, that is, when the distance between the two pulley halves is small and the effective radius is large, the belt winding radius is large.

Figure 10:
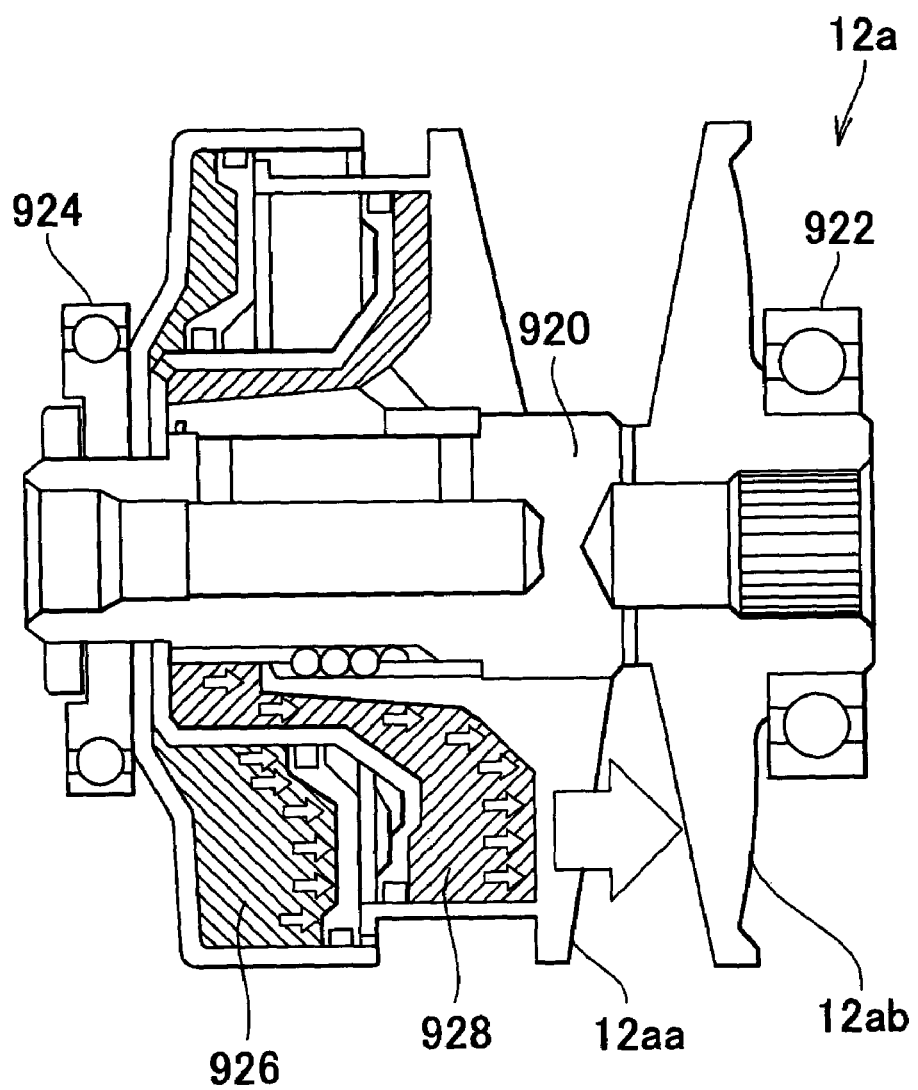
FIG. 10 is a view showing a detailed configuration of the primary pulley.

FIG. 10 shows a detailed configuration of the primary pulley 12a. The upper half portion with respect to the axis line shows a case where the groove width is large and the gear ratio is large (the effective radius is small). The lower half portion with respect to the axis line shows a case where the groove width is small and the gear ratio is small (the effective radius is large).

A shaft portion 920 of the primary pulley 12a is supported by a pair of bearings 922, 924. The right pulley half is the fixed pulley half 12ab, and the left pulley half is the movable pulley half 12aa. Two hydraulic chambers 926, 928 are provided adjacent to the movable pulley half 12aa. The movable pulley half 12aa moves so as to be closer to the fixed pulley half 12ab when the pressure oil is supplied to the hydraulic chambers. The hydraulic chambers are provided in series, which can downsize the hydraulic chambers.

Figure 11:
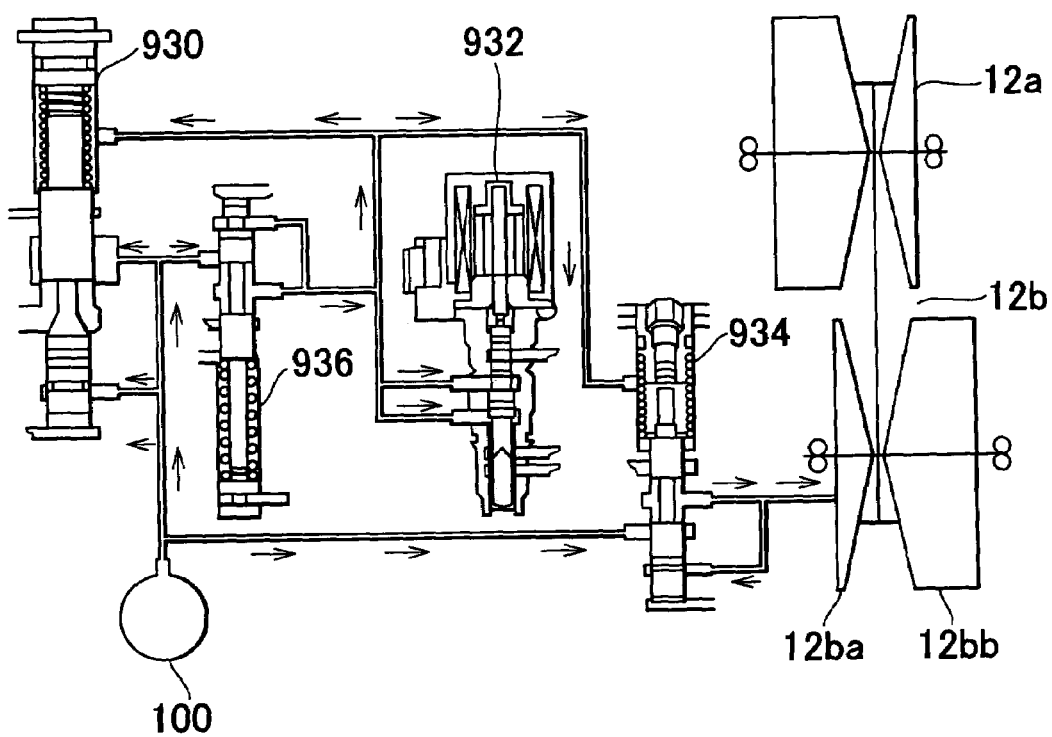
FIG. 11 shows a hydraulic circuit for supplying a hydraulic pressure to a secondary pulley such that a belt holding force is controlled.

FIG. 11 shows a hydraulic circuit for supplying a hydraulic pressure to the secondary pulley 12b such that the belt holding force is controlled. The operating oil discharged from the oil pump 100 is adjusted so as to have the predetermined line pressure $P_L$ by a primary regulator valve 930 which functions as a pressure control valve. A signal pressure of a linear solenoid 932 which is controlled by the HVECU 60 is supplied to the primary regulator valve 930. The line pressure is controlled according to the signal pressure. The reference numerals 934, 936 denote control valves. In the hydraulic circuit, the belt holding force is controlled independently of the shift control of the primary pulley, since a pressure control valve and an electromagnetic valve are provided on a downstream side of the line pressure. The linear solenoid 932 controls the hydraulic pressure to the secondary pulley according to the input shaft torque so as to control the belt holding force.

Figure 12:
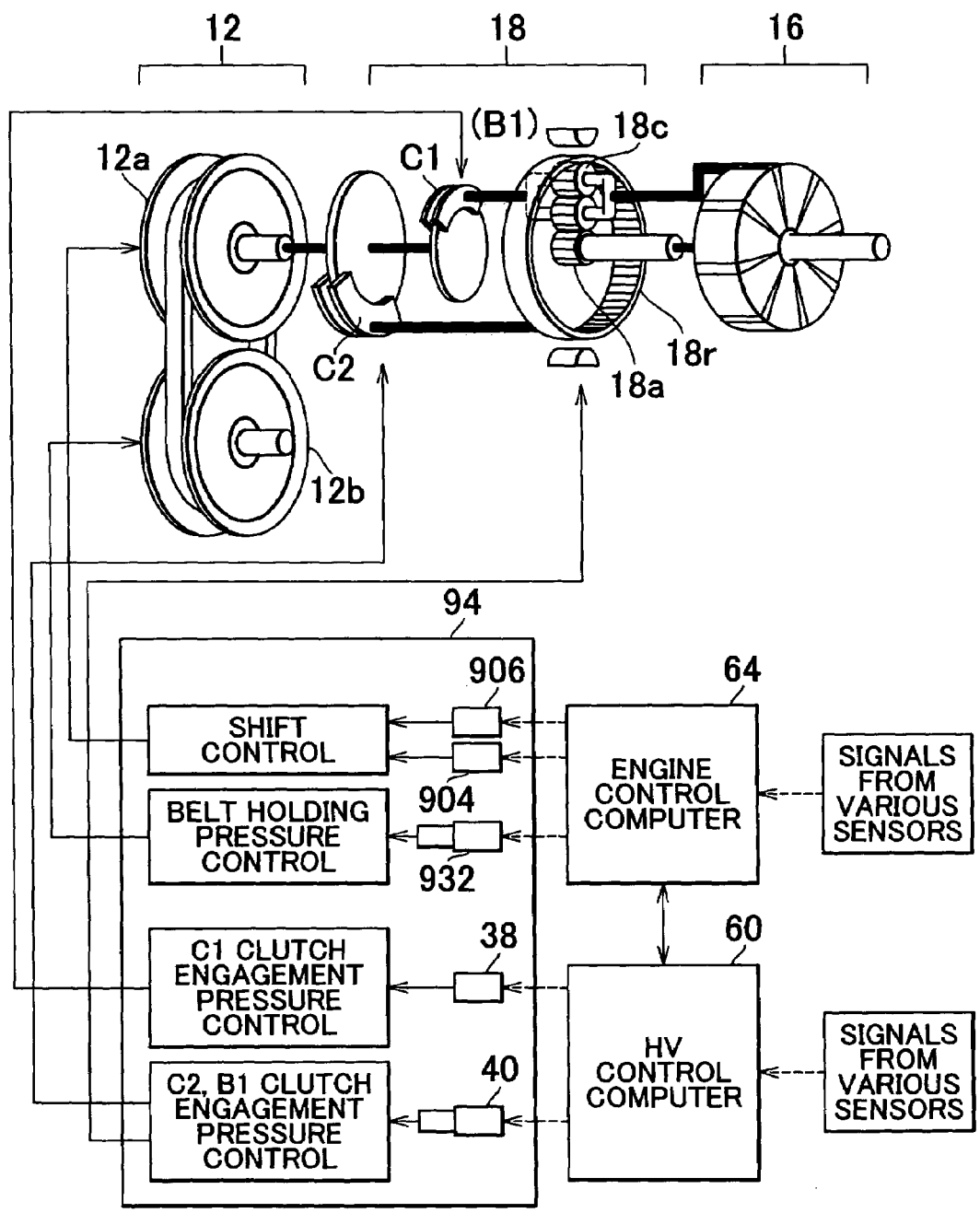
FIG. 12 is a control block diagram for a hydraulic actuator of the transaxle.

FIG. 12 is a block diagram showing the control of the hydraulic actuator of a transaxle performed by the hybrid computer 60 and the engine control computer (the engine ECU) 64.

The hybrid computer 60 determines the vehicle operation state based on signals from various sensors so as to determine how to control the clutches and the brake, and computes the engagement pressures. The hybrid computer 60 then supplies a control signal to the duty solenoid 38 so as to control the engagement pressure of the C1 clutch, and supplies a control signal to the linear solenoid 40 so as to control the engagement pressure of the C2 clutch and the engagement pressure of the B1 brake. Control necessary for the power switching mechanism 18 of the transaxle can be performed by the control of these engagement pressures.

Figure 13:
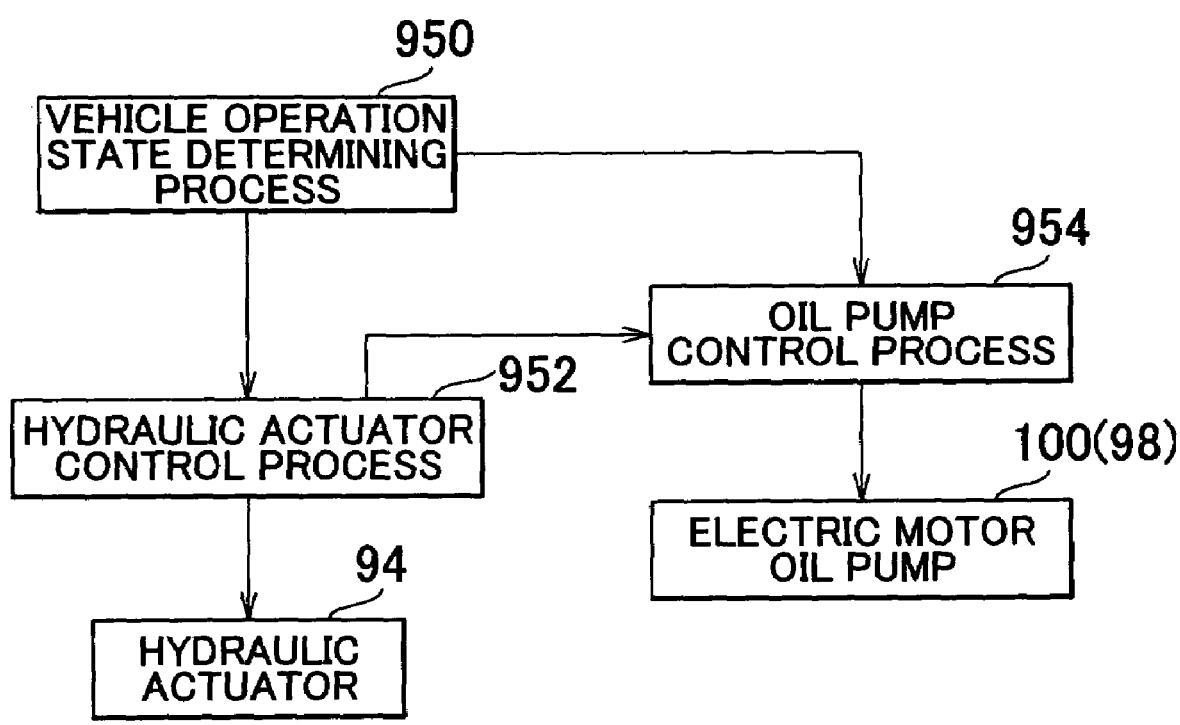
FIG. 13 is a block diagram showing a hydraulic control system which is realized by the invention.

Meanwhile, the engine control computer 64 supplies control signals to the solenoids 904, 906 so as to perform shift control of the primary pulley 12b, and supplies a control signal to the linear solenoid 932 so as to control the belt holding force of the secondary pulley. A vehicle operation state (a running mode) determining process 950, a control process 952 for the hydraulic actuator 94 of the transaxle, and a control process 954 for the oil pump 100, which are shown in FIG. 13, are performed by the hybrid computer and the engine control computer.

In the vehicle operation state determining process 950, for example, the hybrid computer 60 determines whether the vehicle is in a light load running mode, a medium light load running mode, an acceleration/rapid acceleration mode or a deceleration/braking mode according to signals from various sensors.

The light load running mode corresponds to an area in which an engine efficiency is low, for example, the vehicle is running at a low speed or the vehicle is running on a gentle downslope. In this mode, the engine is stopped, and the vehicle runs using the motor generator.

The medium light load running mode corresponds to an area in which the engine efficiency is high. In this mode, the engine is started and the vehicle runs using the engine. The acceleration mode corresponds to an area in which the engine power needs to be increased. In this mode, the vehicle is accelerated by increasing the gear ratio of the CVT. In the area of rapid acceleration, the driving force of the vehicle is assisted by the motor generator.

In the deceleration and braking modes, the driving force from the wheels makes the motor generation operate as a power generator. During regenerative braking, the gear ratio of the CVT is controlled such that the optimum regenerative efficiency is obtained.

In the control process 952 for the hydraulic actuator, it is determined whether the control for these hydraulic circuits (refer to FIG. 4) is necessary, in order to change the hydraulic pressure for the clutches C1, C2 and the brake B1, which realize a predetermined power switch state appropriate for each running mode. When it is determined that the hydraulic pressure needs to be changed, control signals for the solenoid and the valve are output to the hydraulic circuit. Further, it is determined whether the hydraulic pressure needs to be changed in order to obtain a gear ratio of the CVT and a belt holding force which are appropriate for each running mode. Then, control signals for the solenoid and the valve are output to the hydraulic circuits shown in FIGS. 9, 11.

In the control process 954 for the rotation of the oil pump motor, it is determined whether a mode is a first mode, a second mode or a third mode. In the first mode, the rotational speed of the electric oil pump 26 (refer to FIG. 2) is maintained in a low rotational speed region. In the second mode, the rotational speed of the electric oil pump motor is maintained in a high rotational speed region. In the third mode, the rotational speed of the electric oil pump is returned from the low rotational speed region to the high rotational speed region.

In the vehicle operation state determining process 950, when it is determined that the vehicle is in the light load running mode, a low hydraulic pressure needs to be maintained such that the gear ratio and the belt holding force of the CVT, and the engagement state of the clutch are maintained. Accordingly, in the running mode, a status flag (set in a resistor in a predetermined area of a hybrid computer memory) of the oil pump is set to "1" indicative that the rotational speed of the oil pump motor is in the low rotational speed region.

The hybrid computer 60 checks the status flag of the oil pump 100, and controls the inverter 74 such that a rated signal for maintaining the rotational speed of the oil pump motor in the low rotational speed region is output from the electric oil pump drive circuit of the inverter 74, when the status flag is set to "1". When the rotational speed of the oil pump motor is in the low rotational speed region, the rotational speed of the oil pump motor is maintained at a rotational speed value at which a hydraulic pressure, that is obtained by adding a margin pressure to the minimum line pressure, can be generated.

When the vehicle running mode is switched to a medium light load running mode or the acceleration mode, control for changing the gear ratio of the CVT, control for changing the belt holding force, and the power switching control are necessary. Further, a hydraulic pressure for lubricating various portions of the transaxle needs to be enhanced. Accordingly, the rotational speed of the oil pump motor is increased so as to be in the high rotational speed region. In this mode, the status flag resistor is reset to "0".

When the vehicle is stopped, the rotational speed of the oil pump motor may be set to be lower than the rotational speed at which the minimum line pressure is generated, that is not in any of the above-mentioned modes.

Next, a routine for controlling a change in the rotational speed of the oil pump motor, which is performed by the hybrid computer and the engine control computer, will be described using a flowchart in FIG. 14.

In step S14A, it is determined whether the rotational speed of the oil pump motor is continuously maintained in the low rotational speed region depending on whether the status flag F of the oil pump motor is set to "1". The rotational speed of the oil pump motor is feedback-controlled by the HVECU 60. When the status flag is set to "1", the process proceeds to a routine for determining return of the rotational speed of the oil pump motor in step S14B and the following steps.

When the status flag is not set to "1", the process proceeds to step S14S, and the oil pump motor is maintained in the high speed rotation state and the rotational speed of the oil pump is controlled so as to fluctuate in the high rotational speed region according to the vehicle operation state.

The return determining routine in step S14B and the following steps is a control action for performing the determination that the rotational speed of the oil pump motor in the low rotational speed region needs to be returned to the high rotational speed region promptly and accurately. In the routine, determination is made based on a change in the control status of the hybrid computer (the hybrid circuit control portion) for outputting the control signal to the hydraulic circuit of the predetermined hydraulic actuator of the transaxsle. In step S14B, the hybrid computer 60 determines whether the state has occurred where the hydraulic pressure supplied to the clutch of the power switching mechanism 18 needs to be increased, that is, whether the engagement of the clutch needs to be performed. When an affirmative determination is made, a control signal for engaging the clutch C1 or the clutch C2 is output to the solenoids 38, 40. When this control state occurs or the control signal is output, the hybrid computer 60 sets the flag "1" for performing the control for returning the oil pump motor rotational speed from the low rotational speed region to the high rotational speed region in the oil pump motor rotation return control flag resistor FF (step S14T).

When a negative determination is made in step S14B, the process proceeds to step S14C. In this step, an absolute value and a predetermined value of a speed at which shifting of the CVT is performed (hereinafter, referred to as a "shifting speed") are compared with each other. FIG. 15 shows details of the step. When the routine in FIG. 15 is started, the hybrid computer 60 constantly computes the gear ratio and the rate of change of the gear ratio (shifting speed) in order to determine whether it is necessary to increase the hydraulic pressure supplied to the primary pulley 12*a* shown in FIG. 9. Then, the routine in FIG. 15 ends. The process then returns to step S14D in FIG. 14.

When the routine in FIG. 15 is started, the process proceeds to step S15A, and the gear ratio of the primary pulley is calculated. The gear ratio is calculated using an equation (the rotational speed of the primary pulley/the rotational speed of the secondary pulley). These rotational speeds are detected by the speed sensors set in the pulleys.

In a predetermined area of the memory of the hybrid computer 60, a correlation between the gear ratio and the belt winding radius is preset in a form of a memory table. In step S15B, the belt winding radius is read based on the present gear ratio, a speed at which the belt winding radius changes is computed, and further an absolute value of the speed is computed and is stored in the predetermined memory area. When the process ends, the hybrid computer ends the routine in FIG. 15 and the process returns to step 14C in FIG. 14. In this step, the absolute value and the predetermined value are compared with each other. When the absolute value is equal to or larger than the predetermined value, the process proceeds to step S14T. When a negative determination is made in step S14C, the process proceeds to step S14D.

The reason for setting the predetermined value in step S14C is as follows. In a vehicle running state where the gear ratio of the primary pulley is changed only slightly, it is not preferable to return the rotational speed of the oil pump motor from the low rotational speed region to the high rotational speed region in terms of the energy efficiency. When the absolute value of the shifting speed is equal to or lower than the predetermined threshold value, even when the rotational speed of the oil pump motor is in the low rotational speed region, the increase amount in the hydraulic pressure for shifting of the CVT is small. Accordingly, shifting of the CVT can be performed without delay. The rotational speed of the oil pump motor in the low rotational speed region is set to a value at which a hydraulic pressure, that is obtained by adding a margin pressure to the minimum line pressure, can be generated. Due to the margin pressure, a moderate change in the gear ratio can be realized. The predetermined threshold values for upshifting and downshifting may be different.

The reason for determining shifting speed by computing the belt winding radius based on the gear ratio is as follows. A change in the gear ratio and an increase amount in the required hydraulic pressure do not always correspond to each other linearly. On the other hand, a change in the belt winding radius and a change in an amount of the hydraulic pressure correspond to each other linearly. Therefore, the shifting speed is determined based on the speed at which the belt winding radius changes.

After the determination is made in step S14C, the process proceeds to step S14D, and the hybrid computer determines whether a state occurs in which the belt holding force for the secondary pulley 12b needs to be enhanced. The hybrid computer detects the occurrence of this state or the output of the control signal to the solenoid 932 of the hydraulic circuit, and performs determination in step S14D. When negative determinations are made in step S14B and S14D, the low rotation status flag "1" of the oil pump motor is maintained.

Figure 16:
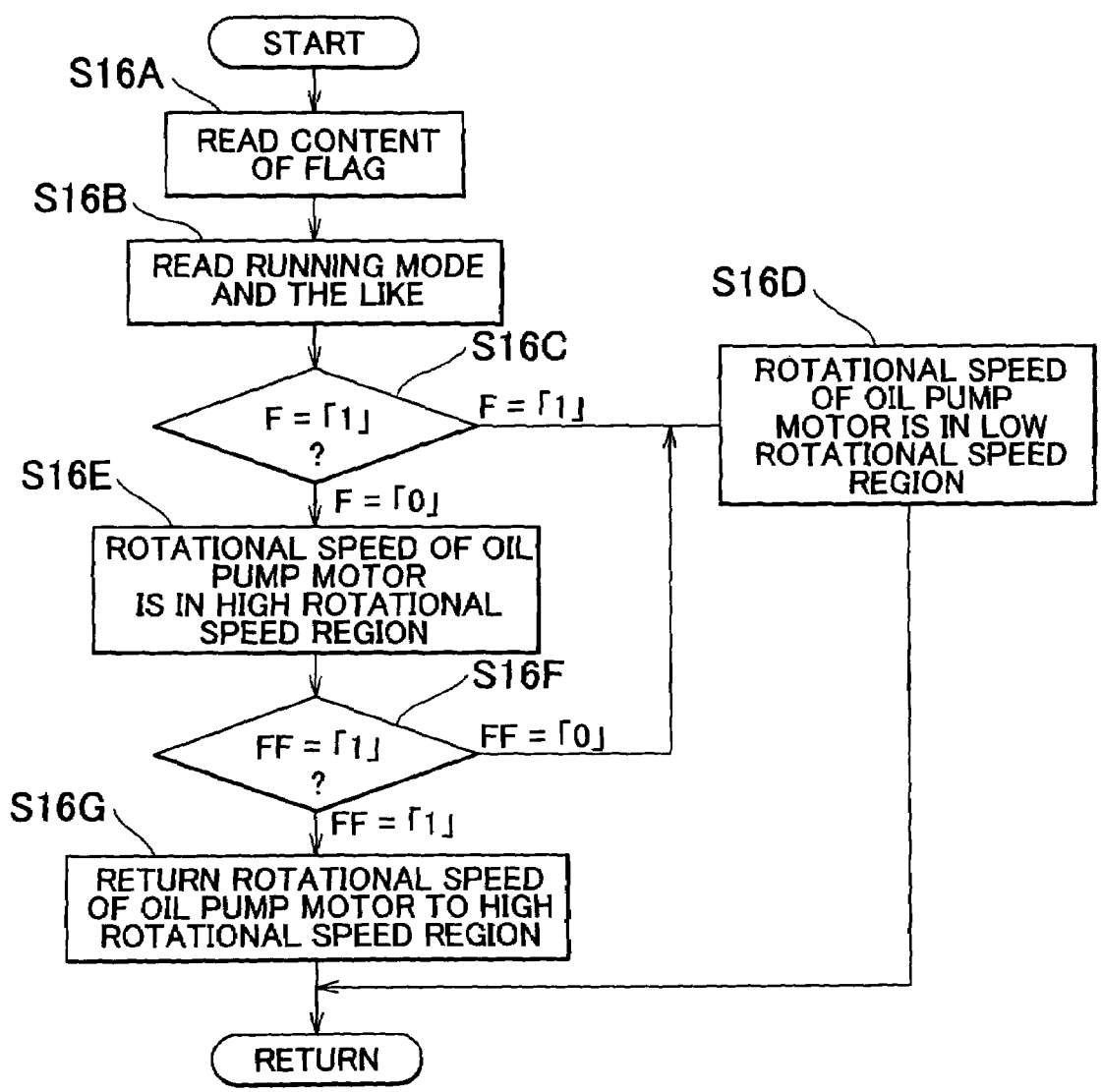
FIG. 16 is a flowchart for explaining a routine for controlling the rotational speed of the oil pump motor.

FIG. 16 is a flowchart explaining the routine for controlling the rotation of the oil pump motor. The hybrid computer reads the contents of the status flag resistor F of the oil pump motor, and the oil pump motor rotation return control flag resister FF (step S116A), then reads the vehicle running mode, and reads the oil temperature and the line pressure (step S16B).

Next, the hybrid computer checks the content of the status flag resister F of the motor. When the flag is set to "1", the hybrid computer determines that the rotational speed of the oil pump motor may be in the low rotational speed region, and maintains the rotational speed of the oil pump motor in the low rotational speed region (step S16D). When the flag F is set to "0", the rotational speed of the oil pump motor is controlled in the high rotational speed region (step S16E).

Next, the hybrid computer checks the rotational speed return determining flag FF. When the flag is set to "1", the process proceeds to step S16G, and the rotational speed of the oil pump motor in the low rotational state is returned to a target rotational speed in the high rotational speed region promptly, and the setting flag of the flag resister FF is reset. The hybrid computer maintains the rotational speed of the oil pump motor, which has returned to the high rotational speed region, in a high rotational speed region for a predetermined time.

Figure 17:
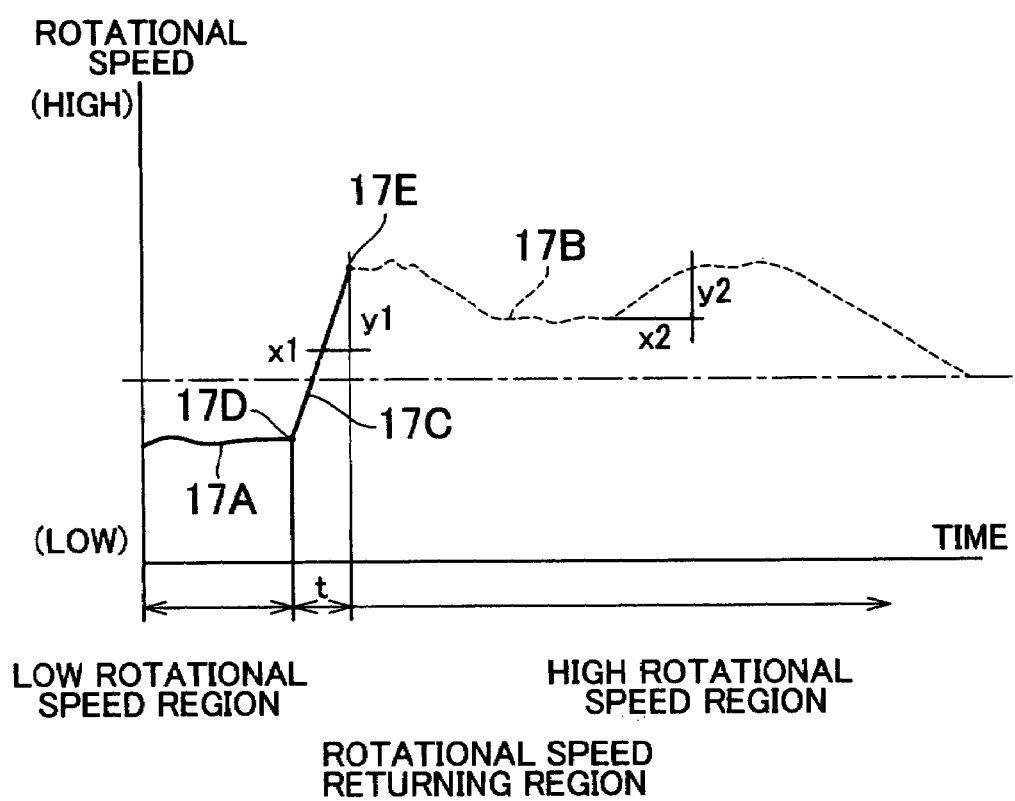
FIG. 17 is a graph showing a change in the rotational speed of the oil pump motor with respect to time.

FIG. 17 shows a change in the rotational speed of the oil pump motor with respect to time. A reference numeral 17A signifies that the rotational speed of the oil pump motor is in the low rotational speed region, a reference numeral 17B signifies that the rotational speed of the oil pump motor is in the high rotational speed region, and a reference numeral 17C signifies that the rotational speed of the oil pump motor is in the process of returning from the low rotational speed region to the high rotational speed region. In the return process, the rotational speed (17D) of the oil pump rapidly increases to the target high rotational speed (17E). The return inclination (y1/x1) of the rotational speed of the oil pump is set to be larger than the maximum value of the fluctuation inclination (y2/x2) of the rotational speed of the oil pump motor in the high rotational speed region. In both cases where the rotational speed of the oil pump motor is in the low rotational speed region and where the rotational speed of the oil pump motor is in the high rotational speed region, the rotational speed of the oil pump motor is controlled according to a vehicle operation state such as an oil temperature, a required line pressure, an accelerator opening, and a vehicle speed.

When the vehicle is decelerated, and is in the light load running mode, the hybrid computer 60 determines whether the light load running mode continues for a predetermined time. When an affirmative determination is made, the hybrid computer sets the oil pump motor status flag resister to "1". The hybrid computer decreases the rotational speed of the oil pump motor to the low rotational speed region, and maintains the decreased rotational speed (step S16A to S16D in FIG. 16).

From this state, when the vehicle is accelerated, and is switched from the motor generator running state (clutch C1: ON, clutch C2: OFF) to the engine running state (C1: ON, C2: ON), it is determined that an engagement of the clutch C2 is further required. Then, the process proceeds from step S14B to step S14T in FIG. 14, the oil pump rotation return flag resister FF is set to "1", the rotational speed of the oil pump motor is returned from the low rotational speed region to the high rotational speed region promptly (step S16G in FIG. 16), and the high rotational speed is maintained for a predetermined time. In the running mode, the status flag resistor F of the oil pump motor is reset to "0" before the predetermined time elapses. Accordingly, even after the predetermined time elapses, the rotational speed of the motor is maintained in the high rotational speed region (step S16E in FIG. 16).

Meanwhile, when the vehicle is in the light load running mode, and is moderately accelerated, running using the motor generator is maintained, and the state in which the engagement state of the clutch is changed is not realized. Accordingly, the process proceeds to step S14C in FIG. 14, and the shifting speed of the CVT is determined. When the acceleration of the vehicle is relatively large, the process proceeds to step S114T, and the rotational speed of the oil pump motor is returned to the high rotational speed region (step S16G in FIG. 16). On the other hand, when the acceleration is not large, it is determined that there is no request for belt holding in step S14D in FIG. 1, and the low rotational state of the oil pump motor is maintained.

Figure 14:
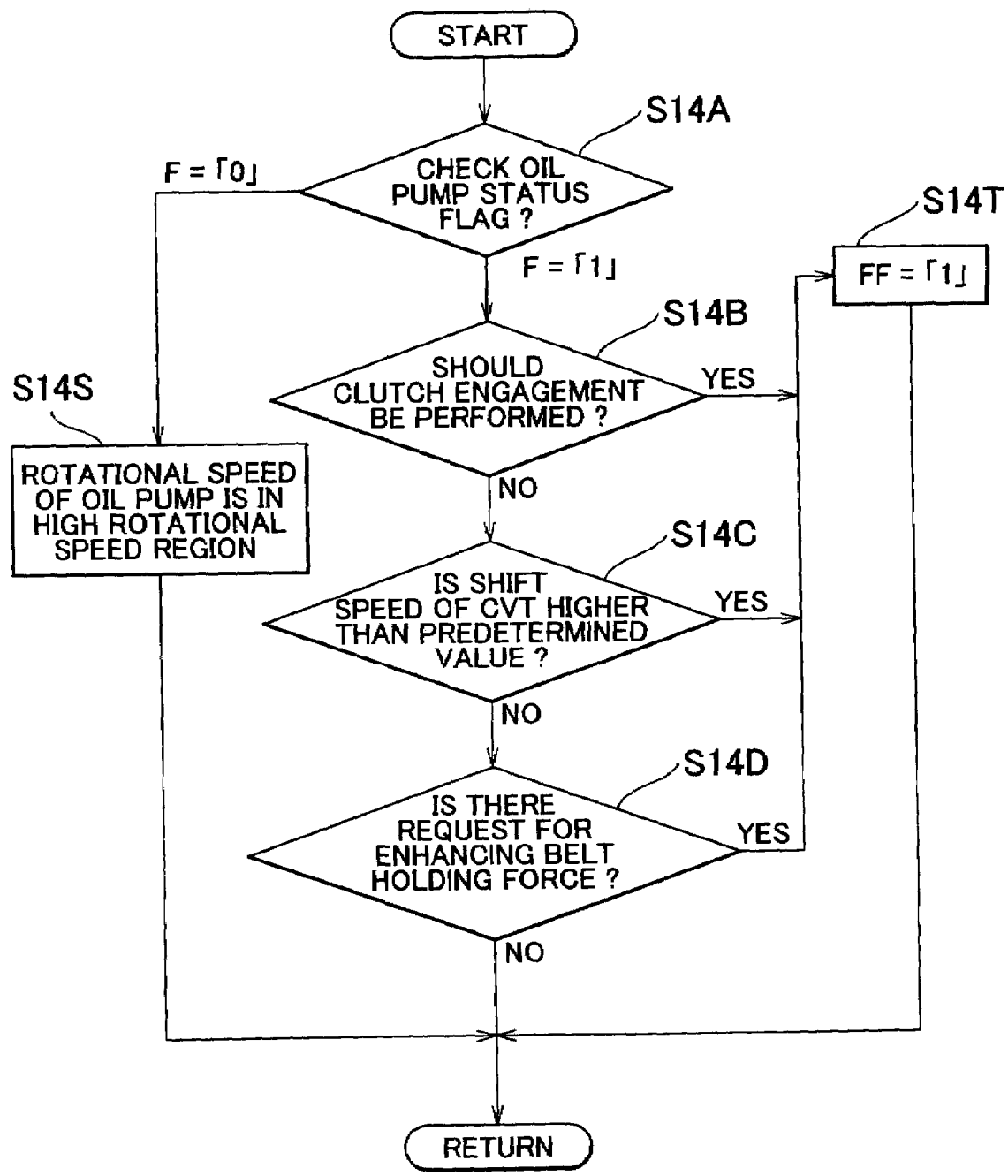
FIG. 14 is a flowchart showing a routine for controlling a change in a rotational speed of an oil pump motor.
Figure 15:
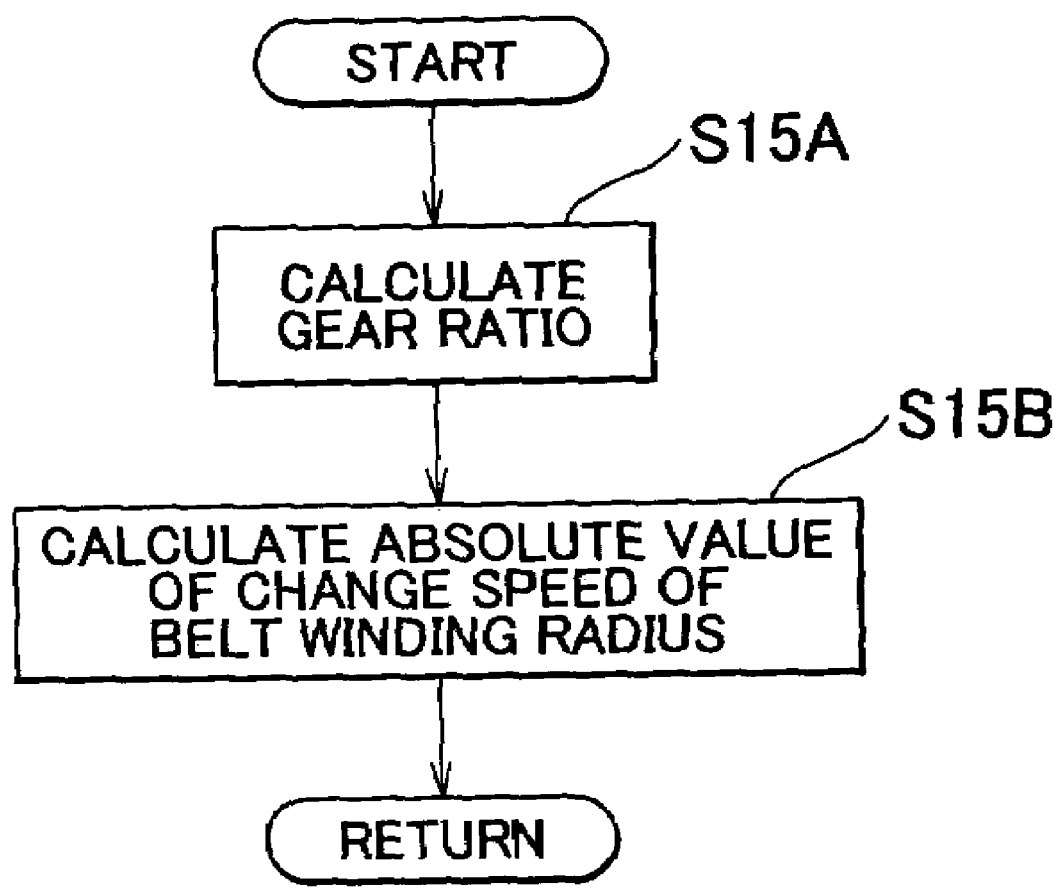
FIG. 15 is a flowchart showing a routine for determining a speed at which shifting is performed in the CVT.

Meanwhile, when the vehicle running state is switched from the light load state to the deceleration state or the braking state, it is determined whether the shifting speed is equal to or smaller than the predetermined value in step S14B in FIG. 14. When the shifting speed is high in terms of obtaining optimum regenerative efficiency, the motor return flag is set to "1" in step S14T. The process proceeds from step S14D to S14T, and the rotational speed of the oil pump motor is returned to the high rotational speed region such that the regenerative efficiency is enhanced by enhancing the belt holding force of the secondary pulley and preventing the slippage of the belt even when the shifting speed is low (step S16G in FIG. 16).

The embodiment described so far can be modified as required within a scope of the invention. For example, as an automatic transmission, a CVT using a power roller may be employed instead of a belt type. A vehicle may be an engine-driven gasoline diesel vehicle, or an electric motor driven type electric vehicle, instead of a hybrid type. A rotational speed of an electric oil pump may be in a low rotational speed region when negative determinations are made in all the steps S14B to step S14C in FIG. 14.

As described so far, according to the invention, a control requested for an actuator is determined, and a rotational state of an electric oil pump is controlled directly based on a load fluctuation command for the actuator, which is obtained based on the determination result. Accordingly, when a hydraulic pressure is required for driving the actuator, the rotational speed of the oil pump can be increased before driving the actuator. Therefore, the rotational speed of the electric oil pump motor, which is in the low rotation state, can be returned to the required high rotational speed region promptly without delay.

In addition, even in a regenerative power generation state and the like which are specific to the hybrid vehicle, the rotational speed of the electric oil pump motor can be returned to the required high rotational speed region promptly without delay.

Further, according to the invention, a return inclination of the rotational speed of the oil pump from the low rotational speed region to the high rotational speed region is set to be larger than a fluctuation inclination of the rotational speed of the oil pump in the high rotational speed region. Accordingly, even in an early stage of a change in the vehicle operation state, the rotational speed of the oil pump is not insufficient, and the required hydraulic pressure can be generated.

What is claimed is:

1. A hydraulic control apparatus for a vehicle, comprising:
   an electric oil pump;
   a pump control portion which controls the electric oil pump;
   a hydraulic circuit portion which supplies a hydraulic pressure from the electric oil pump to an actuator of a transaxle of the vehicle;
   a hydraulic circuit control portion which outputs a control signal to the hydraulic circuit portion;
   an oil pump rotation control portion which is provided in the pump control portion and which controls a rotational state of the electric oil pump according to a change in a control status of the hydraulic circuit control portions;
   an operation state determining portion which determines an operation state of the vehicle; and
   a hydraulic pressure determining portion which determines whether a hydraulic pressure in the hydraulic circuit portion of the vehicle needs to be in a low hydraulic pressure region or in a high hydraulic pressure region based on a result of determination made by the operation state determining portion, wherein the hydraulic circuit control portion computes the control signal based on the result of determination made by the operation state determining portion, and the oil pump rotation control portion controls a rotational speed of the electric oil pump based on a result of determination made by the hydraulic pressure determining portion.

2. The hydraulic control apparatus for a vehicle according to claim 1, wherein the hydraulic pressure determining portion determines that the hydraulic pressure in the hydraulic circuit portion needs to be in the low hydraulic pressure region when the vehicle is in a light load running state.

3. The hydraulic control apparatus for a vehicle according to claim 1, wherein the oil pump rotation control portion sets the rotational speed of the electric oil pump to be in a low rotational speed region when it is determined as a result of determination made by the hydraulic pressure determining portion that the hydraulic pressure of the hydraulic circuit portion needs to be in the low hydraulic pressure region, and sets the rotational speed of the electric oil pump to be in a high rotational speed region with respect to the low rotational speed region when it is determined as a result of determination made by the hydraulic pressure determining portion that the hydraulic pressure of the hydraulic circuit portion needs to be in the high hydraulic pressure region.

4. The hydraulic control apparatus for a vehicle according to claim 3, further comprising:
   a rotation return portion which is provided in the oil pump rotation control portion, and which returns the rotational speed of the electric oil pump from the low rotational speed region to the high rotational speed region when a status of the hydraulic circuit control portion is switched to a control status for supplying a hydraulic pressure from the hydraulic circuit portion such that the actuator is driven.

5. The hydraulic control apparatus for a vehicle according to claim 4, wherein the oil pump rotation control portion returns the rotational speed of the oil pump from the low rotational speed region to the high rotational speed region when a driving amount of the actuator exceeds a predetermined value.

6. The hydraulic control apparatus for a vehicle according to claim 4, wherein the rotation return portion sets a rate of change of the rotational speed of the electric oil pump when the rotational speed returns from the low rotational speed region to the high rotational speed region to be larger than a rate of change of the rotational speed of the electric oil pump when the electric oil pump is in the high rotational seed region.

7. The hydraulic control apparatus for a vehicle according to claim 4, wherein the actuator is for a clutch mechanism which switches a power source for a drive wheel between an engine and a motor generator using the engagement of a clutch that is controlled by a hydraulic pressure.

8. The hydraulic control apparatus for a vehicle according to claim 7, wherein when the status of the hydraulic circuit control portion is switched to a control status in which a control signal for engaging the clutch is output to the hydraulic circuit portion, the rotation return portion returns the rotational speed of the electric oil pump from the low rotational speed region to the high rotational speed region.

9. The hydraulic control apparatus for a vehicle according to claim 4, wherein the actuator is for an automatic transmission including a shifting mechanism in which shifting is performed using hydraulic pressure.

10. The hydraulic control apparatus for a vehicle according to claim 9, wherein the automatic transmission is a belt drive continuously variable transmission.

11. The hydraulic control apparatus for a vehicle according to claim 10, wherein when the status of the hydraulic circuit control portion is switched to a control status in which a control signal for changing a speed at which shifting is performed in a belt drive continuously variable transmission is output to the hydraulic circuit portion, the rotation return portion returns the rotational speed of the electric oil pump from the low rotational speed region to the high rotational speed region.

12. The hydraulic control apparatus for a vehicle according to claim 10, wherein when the status of the hydraulic circuit control apparatus is switched to a control status in which a control signal for increasing a belt holding force of the belt drive continuously variable transmission is output to the hydraulic control portion, the rotation return portion returns the rotational speed of the electric oil pump from the low rotational speed are to the high rotational speed area.

13. The hydraulic control apparatus for a vehicle according to claim 10, wherein when an absolute value of a speed at which shifting of the belt drive continuously variable transmission is performed is equal to or larger than a predetermined value, the rotation return portion returns the rotational speed of the electric oil pump.

14. The hydraulic control apparatus for a vehicle according to claim 13, wherein the hydraulic circuit control portion determines the speed at which shifting is performed according to a speed at which a belt winding radius of a primary pulley of the belt drive continuously variable transmission changes.

15. A hydraulic control apparatus for a vehicle, comprising:
an electric oil pump;
a control portion for the electric oil pump;
a hydraulic circuit portion which supplies a hydraulic pressure from the electric oil pump to an actuator of a transaxle of the vehicle;
a hydraulic circuit control portion which outputs a control signal to the hydraulic circuit portion;
an operation state determining portion which determines an operation state of the vehicle,
a hydraulic pressure determining portion which determines whether a hydraulic pressure in the hydraulic circuit portion of the vehicle needs to be in a low hydraulic pressure region or in a high hydraulic pressure region based on a result of determination made by the operation state determining portion;
an oil pump rotation control portion which controls a rotational state of the electric oil pump based on a result of determination made by the hydraulic pressure determining portion;
a rotation return portion which sets the rotational speed of the electric oil pump to be in a low rotational speed region when it is determined as a result of determination made by the hydraulic pressure determining portion that the hydraulic pressure of the hydraulic circuit portion needs to be in the low hydraulic pressure region, and sets the rotational speed of the electric oil pump to be in a higher rotational speed region than the low rotational speed region when it is determined as a result of determination made by the hydraulic pressure determining portion that the hydraulic pressure of the hydraulic circuit portion needs to be in the high hydraulic pressure region, and which returns the rotational speed of the electric oil pump from the low rotational speed region to the high rotational speed region, wherein the rotation return portion sets a rate of change of the rotational speed of the electric oil pump when the rotational speed returns from the low rotational speed region to the high rotational speed region to be larger than a rate of change of the rotational speed of the electric oil pump when the electric oil pump is in the high rotational speed region.

16. A control method of a hydraulic control apparatus for a vehicle, which comprises an electric oil pump; a pump control portion which controls the electric oil pump; a hydraulic circuit portion which supplies a hydraulic pressure from the electric oil pump to an actuator of a transaxle of the vehicle; and a hydraulic circuit control portion which outputs a control signal to the hydraulic circuit portion; comprising the step of:
controlling a rotational state of the electric oil pump with an oil pump rotation control portion provided in the pump control portion according to a change in a control status of the hydraulic circuit control portion;
determining an operation state of the vehicle with an operation state determining portion, and
determining with a hydraulic pressure determining portion whether a hydraulic pressure in the hydraulic circuit portion of the vehicle needs to be in a low hydraulic pressure region or in a high hydraulic pressure region based on a result of determination made by the operation state determining portion, wherein the hydraulic circuit control portion computes the control signal based on the result of determination made by the operation state determining portion, and the oil pump rotation control portion controls a rotational speed of the electric oil pump based on a result of determination made by the hydraulic pressure determining portion.

* * * * *